US006832675B2

United States Patent
Kao et al.

(10) Patent No.: US 6,832,675 B2
(45) Date of Patent: Dec. 21, 2004

(54) FLAT DISK SPRING ASSEMBLY FOR AUTOMATIC TRANSMISSIONS

(75) Inventors: Chi-Kuan Kao, Troy, MI (US); Anthony L. Smith, Troy, MI (US); Andrew Leslie Bartos, Clarkston, MI (US); Patrick Benedict Usoro, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/406,625

(22) Filed: Apr. 3, 2003

(65) Prior Publication Data

US 2004/0195070 A1 Oct. 7, 2004

(51) Int. Cl.[7] ................................................ F16D 13/00
(52) U.S. Cl. ................................ 192/109 A; 192/85 A; 192/52.4; 267/161
(58) Field of Search ...................... 192/85 AA, 109 F, 192/109 A, 52.1, 52.4; 267/161; 188/71.5, 217

(56) References Cited

U.S. PATENT DOCUMENTS

| | | | |
|---|---|---|---|
| 3,237,739 A | * 3/1966 | Pritchard | 192/99 A |
| 3,747,714 A | * 7/1973 | DeCarbon | 188/317 |
| 4,027,865 A | 6/1977 | Greenwood et al. | 267/148 |
| 4,623,055 A | * 11/1986 | Ohkubo | 192/85 AA |
| 5,117,077 A | * 5/1992 | Sakurada | 200/516 |
| 5,579,944 A | 12/1996 | Hafner et al. | 188/68 |
| 5,709,516 A | 1/1998 | Peterson et al. | 411/544 |
| 5,794,753 A | * 8/1998 | Kemper | 192/89.25 |
| 5,887,691 A | * 3/1999 | Kemper | 192/89.22 |
| 6,152,276 A | 11/2000 | Rohs et al. | 182/89.23 |
| 6,216,839 B1 | 4/2001 | Rudolf et al. | 192/70.27 |
| 6,666,314 B2 | * 12/2003 | Kleifges | 192/70.18 |

OTHER PUBLICATIONS

"The Uniform–Section Disk Spring" by J. O. Almen and L. Laszlo, Transactions of the American Society of Mechanical Engineers—Research Papers.

* cited by examiner

*Primary Examiner*—Roger Pang
*Assistant Examiner*—Eric M. Williams
(74) *Attorney, Agent, or Firm*—Kathryn A. Marra

(57) ABSTRACT

A disk spring assembly including a flat disk between two angled plates is used in an automatic transmission clutch application. The inner peripheral edge and the outer peripheral edge of the disk are deflected in opposite directions relative to each other by the angled plates. The maximum deflection of the disk is defined by the angled plates. The stiffness of the disk increases monotonically with the deflection of the disk resulting in smooth clutch application.

24 Claims, 5 Drawing Sheets

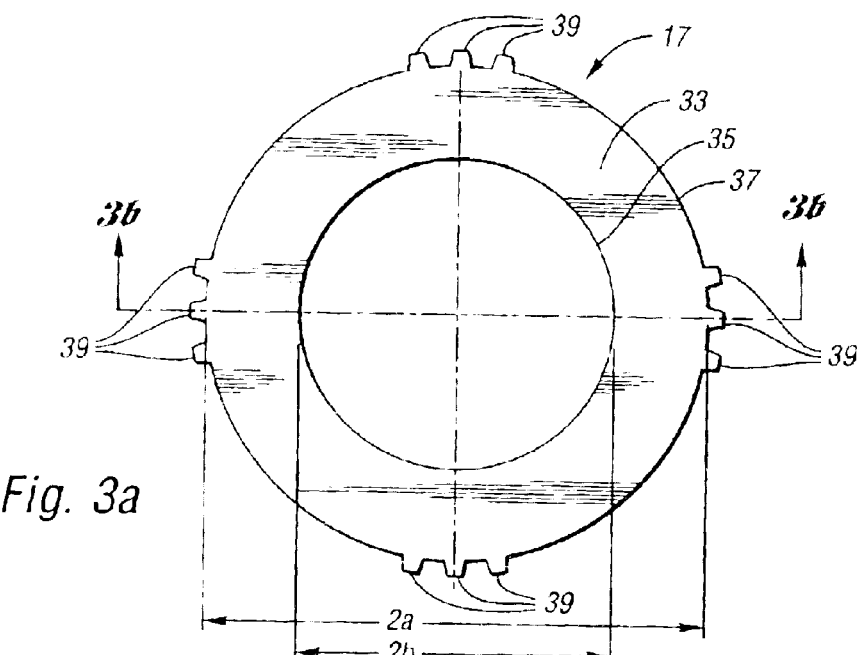
Fig. 3a
Fig. 3b
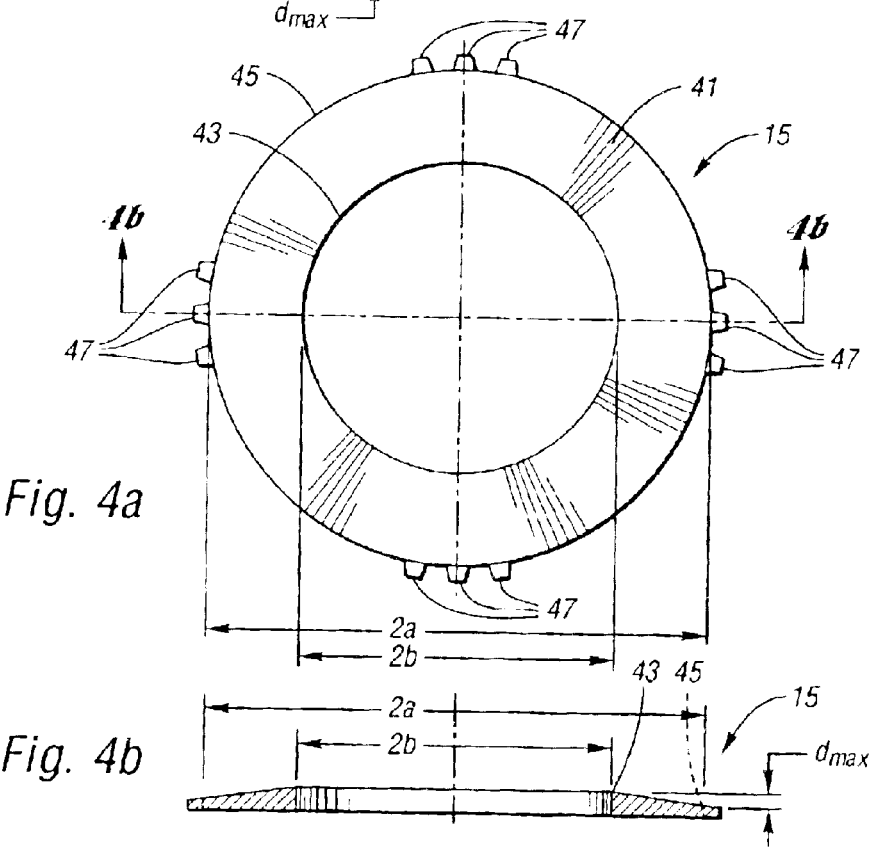
Fig. 4a
Fig. 4b

FLAT DISK SPRING ASSEMBLY FOR AUTOMATIC TRANSMISSIONS

TECHNICAL FIELD

This invention relates to clutch applications for automatic transmissions.

BACKGROUND OF THE INVENTION

Ideally, clutches used in automatic transmissions should engage smoothly. Range clutches typically employ a filter spring to lessen the initial impact of the clutch engaging, resulting in a smoother ride. The spring is positioned between the force acting to engage the clutch and the clutch itself to lessen the impact of the force. Ideally, an impact filter spring should have a small stiffness at small deflections and a monotonically increasing stiffness during deflection (i.e., a stiffness that increases at a constant rate over the deflection range) until a fully loaded condition is reached.

Two kinds of washer springs are typically used in automatic transmissions: wave washer springs and Belleville washer springs. Wave washer springs have a waved surface configuration that affects the stiffness of the spring. Belleville washer springs have a cone-shaped portion that is flattened during deflection of the spring. The wave washer has a stiffness that is a constant between 20 percent and 80 percent of its deflection range. The Belleville washer has a stiffness that decreases monotonically with respect to deflection. Accordingly, neither of these types of springs have the desired characteristic of monotonically increasing stiffness over the deflection range of the spring.

SUMMARY OF THE INVENTION

A disk spring assembly for smooth clutch application may include a substantially flat ring-shaped disk having opposed faces and a hole formed in the center of the disk such that the disk has an inner peripheral edge and an outer peripheral edge. The disk may have an inner radius at its inner peripheral edge and an outer radius at its outer peripheral edge. Furthermore, the disk may have a substantially uniform thickness between its opposed faces. The disk may be steel. The assembly may also have a movable first angled plate located adjacent to one opposed face. The assembly may further include a second angled plate located adjacent to the other opposed face such that the inner and outer peripheral edges of the disk are deflected in opposite directions relative to each other when the disk moves toward the second plate during engagement of the clutch. The maximum deflection of the disk may be defined by the angled plates.

The first and second angled plates may each have an angled face. The angled face of the first plate may be located adjacent to a face of the disk such that an angle is formed by the first plate and the disk at the inner peripheral edge. The angled face of the second plate may be located adjacent to the opposed face of the disk such that a substantially equivalent angle is formed by the second plate and the disk at the outer peripheral edge. The first plate may be configured such that it first contacts and applies load at the inner peripheral edge of the disk when it moves toward the disk. Furthermore, the second plate may be configured such that it first contacts and applies a reaction load at the outer peripheral edge of the disk when the disk moves toward the second plate by the first plate. The angled face of each plate may have a substantially equivalent inner and outer radius.

The opposed faces of the disk may be in substantially complete contact with respective angled faces of the plates when the clutch is engaged. Additionally, the maximum deflection of the disk may occur when the opposed faces of the disk are in substantially complete contact with the respective angled faces of the plates. The load applied by the first plate may be uniformly distributed across the substantially completely contacted faces of the disk and the plates.

The stiffness of the disk may increase in proportion to the square of the deflection of the disk. Thus, the stiffness of the disk may increase monotonically with the deflection of the disk. The deflection characteristics of initially flat washer springs are discussed in Almen, J. O. and Laszlo, A., "The Uniform-Section Disk Spring," Trans. ASME, Vol. 58, no. 4, May 1936, pp. 305–314. The stiffness of the disk may be the ratio of the change in force applied to the disk to the change in deflection of the disk. The stiffness of the disk is represented by S and may be determined in accordance with the following formula:

$$S = K_1 + 3K_2 d^2 \text{ wherein } K_1 = Nt^3, K_2 = N\frac{t}{2}, N = \frac{E}{(1-v^2)Ma^2},$$

$$\frac{1}{M} = \left(\frac{\alpha+1}{\alpha-1} - \frac{2}{\ln\alpha}\right)\pi\left(\frac{\alpha}{\alpha-1}\right)^2, \text{ and } \alpha = \frac{a}{b},$$

wherein a represents the outer radius of the disk, b represents the inner radius of the disk, E is Young's modulus, t represents the thickness of the disk, and υ is Poisson's ratio. See Almen and Laszlo, supra, pp. 309–312, regarding the derivation of this formula.

A spring assembly for enhancing clutch smoothness may include a substantially flat washer having opposing faces, a first ring-shaped plate with an angled face forming an outwardly conical shape located adjacent to one washer face and a second ring shaped plate with an angled face forming an inwardly conical shape located adjacent to the other washer face, wherein the angled faces are cooperatively configured to contact the respective adjacent faces of the washer when the first plate moves in the direction of the washer during engagement of the clutch.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 2b is a schematic illustration in side cross-sectional view of the disk of FIG. 2a;

FIG. 3a is a schematic illustration in plan view of an angled plate for use in the disk spring assembly of FIG. 1;

FIG. 3b is a schematic illustration in side cross-sectional view of the angled plate of FIG. 3a;

FIG. 4a is a schematic illustration in plan view of another angled plate for use in the disk spring assembly of FIG. 1;

FIG. 4b is a schematic illustration in side cross-sectional view of the angled plate of FIG. 4a;

DESCRIPTION OF THE PREFERRED EMBODIMENTS

Figure 1:
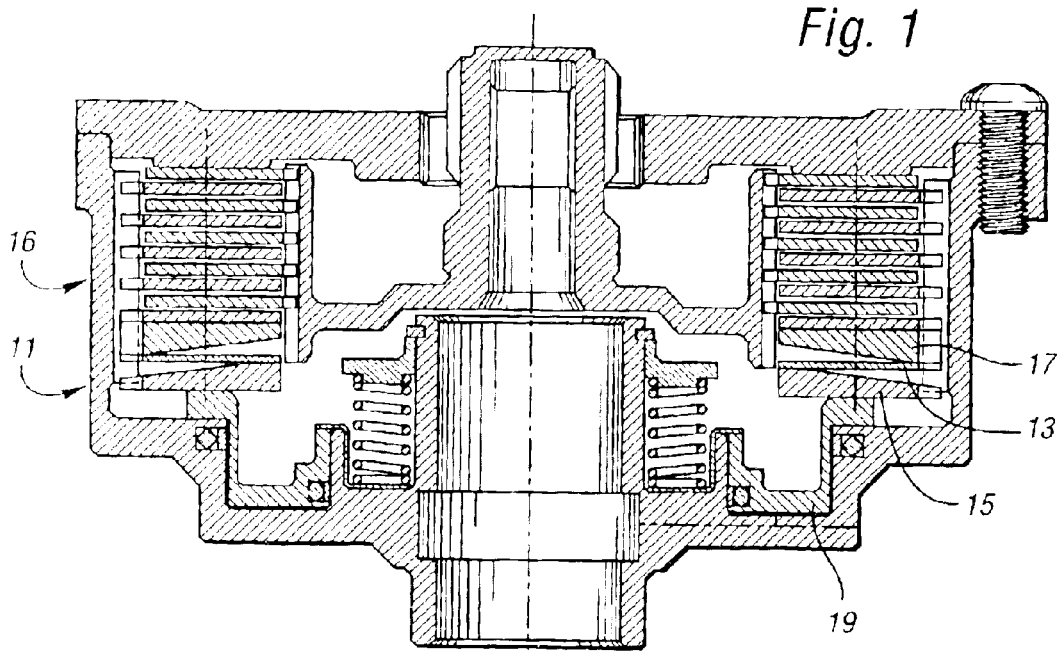
FIG. 1 is a schematic illustration in side cross-sectional view of an automatic transmission clutch including a disk spring assembly.

FIG. 1 shows a disk spring assembly 11 used in a clutch application. The disk spring assembly includes a ring-shaped disk 13, a first angled plate 15, and a second angled plate 17. The ring-shaped disk 13 is also referred to as a washer. The first angled plate 15 is also referred to as a first ring-shaped plate. The second angled plate 17 is also referred to as a second ring-shaped plate. The first angled plate 15 is moveable towards the ring-shaped disk 13 by a piston 19. Fluid force acts upon the piston 19 to move it towards the first angled plate 15 for engaging a clutch 16. The disk spring assembly 11 shown is in an "at rest" state and the clutch is not engaged.

Figure 2A:
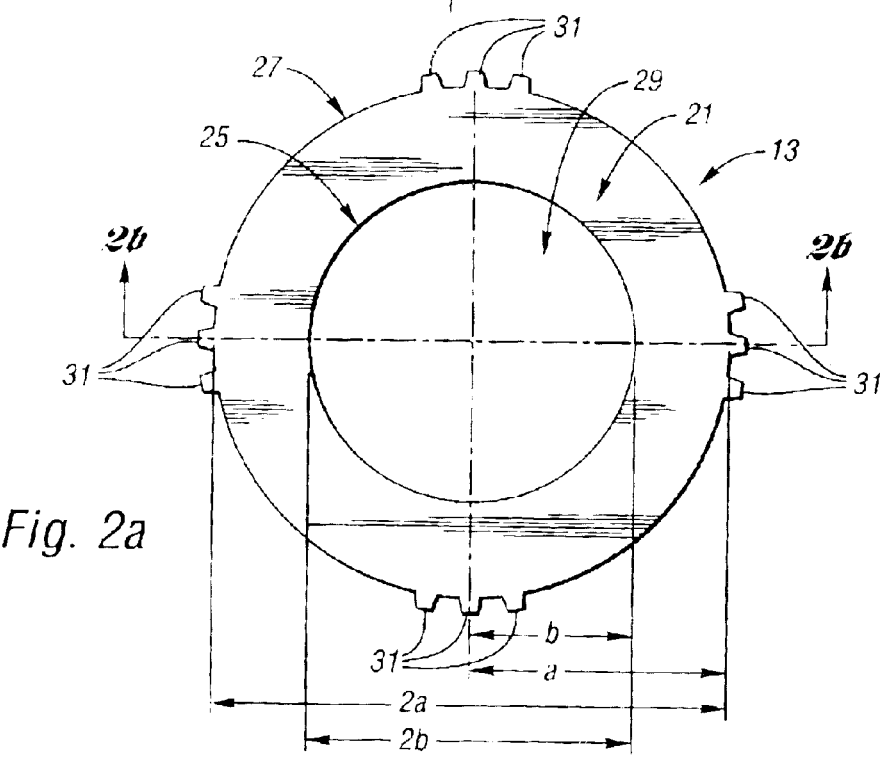
FIG. 2a is a schematic illustration in plan view of a disk for use in the disk spring assembly of FIG. 1.
Figure 2B:
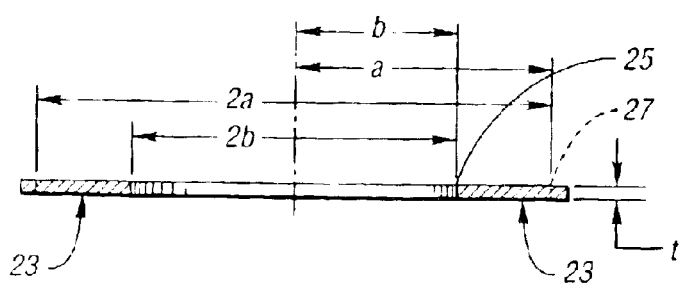

Referring to FIG. 2a, wherein like reference numbers refer to like components in FIG. 1, the ring-shaped disk 13 having a face 21 is shown. The ring-shaped disk 13 also has an opposed face 23 shown in profile in FIG. 2b wherein like reference numbers refer to like components in FIGS. 1-2a. FIG. 2b is a cross sectional view of the disk taken at the arrows shown in FIG. 2a. The disk 13 has an inner peripheral edge 25 and an outer peripheral edge 27. A hole 29 is formed in the center of the disk 13. The disk 13 has an inner radius b measured from the center to the inner peripheral edge 25, and an outer radius a, measured from the center to the outer peripheral edge 27. Referring again to FIG. 2a, the disk 13 has extensions or fingers 31 along the outer peripheral edge 27. The fingers 31 are for guidance in positioning the washer during assembly. The disk 13 may have fewer or more fingers 31 than shown; additionally, a continuous flange around the outer peripheral edge 27 of the disk 13 may be used in place of fingers 31. The fingers 31 are not included within the outer radius a. The disk 13 has a thickness t. The disk 13 is substantially flat, as can be seen in FIG. 2b. The disk 13 is preferably made of steel.

Referring to FIG. 3a, wherein like reference numbers refer to like components in FIGS. 1-2b, the second angled plate 17 is shown having a surface 33 that is away from the washer 13 when assembled as in FIG. 1. The second angled plate 17 has an inner peripheral edge 35 and an outer peripheral edge 37. The inner and outer peripheral edges 35, 37 are at the same inner and outer radii b, a as the inner peripheral edge 25 and the outer peripheral edge 27 of the disk 13 in FIG. 2a.

Referring to FIG. 3b, wherein like reference numbers refer to like components in FIGS. 1-3a, a cross-sectional view of the second angled plate taken at the arrows shown in FIG. 3a is shown. The second angled plate 17 is tapered from its inner peripheral edge 35 to its outer peripheral edge 37 such that it is thicker at its outer peripheral edge 37 than at its inner peripheral edge 35. The distance along an axis through the center of the second angled plate 17 from the beginning of the taper to the end of the taper is shown as $d_{max}$. Referring again to FIG. 3a, the second angled plate 17 has fingers 39 used for guidance during assembly. The second angled plate 17 may have fewer or more fingers 39 than shown; additionally, a continuous flange around the circumference of the second angled plate 17 may be used in place of the fingers 39. The fingers 39 are not part of the taper of the second angled plate 17.

Referring to FIG. 4a, wherein like reference numbers refer to like components in FIGS. 1-3b, a face 41 of the first angled plate 15 having an inner peripheral edge 43 and an outer peripheral edge 45 is shown. Referring to FIG. 4b, wherein like reference numbers refer to like components in FIGS. 1-4a, a cross-sectional view of the first angled plate 15 taken at the arrows shown in FIG. 4a is shown. The first angled plate 15 has substantially the same inner and outer radii b, a as the disk 13. Referring again to FIG. 4a, the first angled plate 15 has fingers 47 at its outer peripheral edge 45 for guidance during assembly. The first angled plate 15 may have fewer or more fingers 47 than shown; additionally, a continuous flange around the circumference of the first angled plate 15 may be used in place of the fingers 47. The first angled plate 15 is tapered such that the inner peripheral edge 43 is thicker than the outer peripheral edge 45. Thus the face 41 is angled. The difference in thickness between the inner peripheral edge 43 and the outer peripheral edge 45 is $d_{max}$. The fingers 47 are part of the taper of the first angled plate 15.

Figure 5:
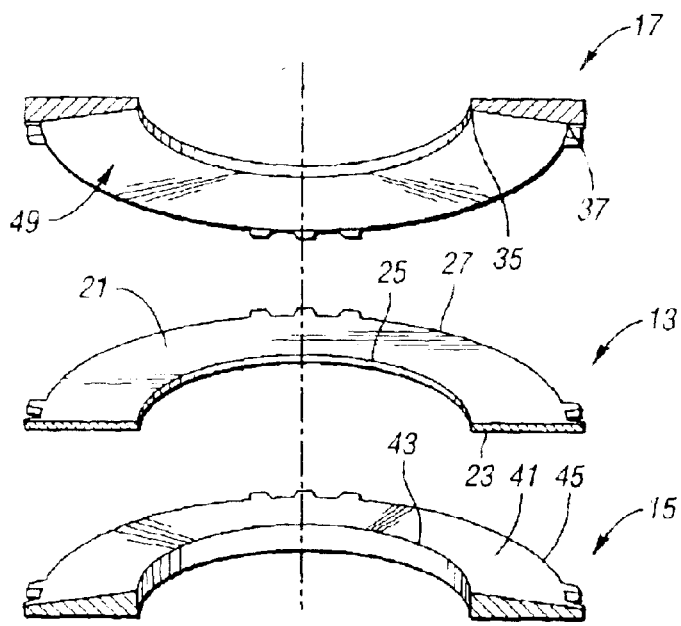
FIG. 5 is a schematic sectional perspective illustration in an exploded view of the disk spring assembly of FIG. 1.

Referring to FIG. 5, wherein like reference numbers refer to like components in FIGS. 1-4b, an exploded view of the second angled plate 17 with the substantially flat ring-shaped disk 13 and the first angled plate 15 in assembled positions (as shown in FIG. 1) relative to one another is shown. The second angled plate 17 has an angled face 49 located adjacent to the face 21 of the ring-shaped disk 13. The second angled plate 17 is shown rotated slightly upward in order to expose the angled face 49. The angled face 49 is angled due to the taper of the second angled plate 17 between its inner peripheral edge 35 and its outer peripheral edge 37. The angled face 49 has an inwardly conical shape defined by the difference in thickness, $d_{max}$, shown in FIG. 3b, of the inner peripheral edge 35 and the outer peripheral edge 37 of the second angled plate 17.

The moveable first angled plate 15 has angled face 41 which has an outwardly conical shape defined by the difference in thickness $d_{max}$, shown in FIG. 4b, between the inner peripheral edge 43 and the outer peripheral edge 45 of the first angled plate 15. The angled face 41 of the first angled plate 15 is adjacent to an opposed face 23 of the flat ring-shaped disk 13.

Figure 6A:
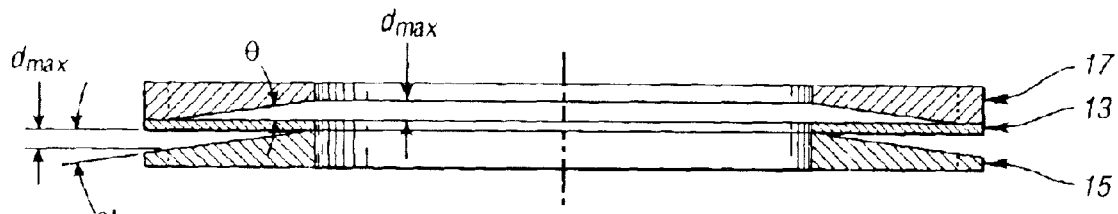
FIG. 6a is a schematic cross-sectional illustration of the disk spring assembly of FIG. 1.

Referring to FIG. 6a, wherein like reference numbers refer to like components in FIGS. 1-5, a cross-sectional view of the disk spring assembly 11 in an "at rest" position without deflection of the disk 13 is shown. An angle theta θ is formed at the outer peripheral edge 27 of the disk 13 between the second angled plate 17 and the disk 13. A substantially equivalent angle θ' is formed at the inner peripheral edge 25 of the disk 13 between the first angled plate 15 and the disk 13. An imaginary line drawn opposite θ between the inner peripheral edge 35 of the angled face 49 of the second angled plate 17 and the inner peripheral edge 25 of the face 21 of the disk 13 has a length $d_{max}$. An imaginary line drawn opposite the angle θ' between the outer peripheral edge 27 at the opposed face 23 of the disk 13 and the outer peripheral edge 45 of the angled face 41 of the first angled plate 15 also has a length $d_{max}$.

Figure 6B:
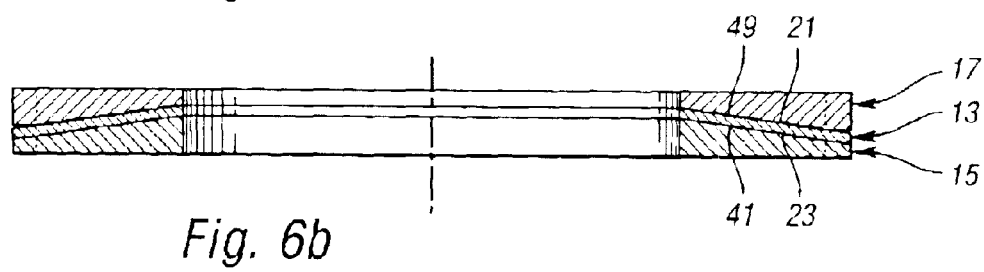
FIG. 6b is a schematic cross-sectional illustration of the disk spring assembly of FIG. 1 showing contact of the angled plate of FIG. 3a and the angled plate of FIG. 4a with the disk of FIG. 1.

Referring to FIG. 6b, wherein like reference numbers refer to like components in FIGS. 1–5, FIG. 6b is a cross-sectional view of the second angled plate 17, the disk 13, and the first angled plate 15, when the angled face of the second angled plate 17 and the angled face of the first angled plate 15 are in substantially complete contact with the respective faces 21, 23 of the disk 13. Substantially complete contact occurs when the clutch 16 of FIG. 1 is in an engaged state with the first angled plate 15 moves towards the second angled plate 17. The maximum deflection of the disk 13 is defined by the angled faces 41, 49 of the plates 15, 17. The maximum deflection of the disk 13 occurs when the opposed faces 21, 23 of the disk 13 are in substantially complete contact with the respective angled faces 49, 41 of the plates 15, 17. Thus, the maximum deflection of the disk is $d_{max}$. The disk is deflected at the angles θ, θ' shown in FIG. 6a, when it is deflected to $d_{max}$, as shown in FIG. 6b. Accordingly, an advantage of the disk spring assembly is that the maximum deflection of the disk and the maximum angle of deflection are controlled by the design of the assembly. When the angled faces 41, 49 of the plates 15, 17 and the faces 23, 21, respectively, of the disk 13 are in substantially complete contact, load applied by the first angled plate 15 is uniformly distributed across these contacted faces.

Figure 7:
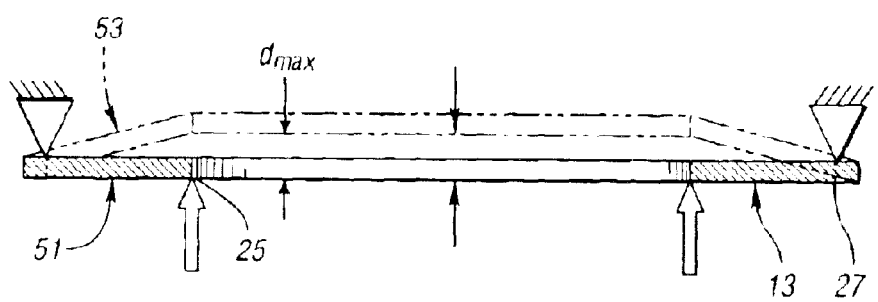
FIG. 7 is a schematic cross-sectional illustration of load forces acting upon the disk of the disk spring assembly of FIG. 6b.

Referring to FIG. 7, wherein like reference numbers refer to like components in FIGS. 1–6b, the deflection of the disk 13 when load is applied at the inner peripheral edge 25 and the outer peripheral edge 27 is depicted. The load is applied in the direction of an axis through the center of the flat disk 13. The disk 13 is shown in a first undeflected position 51. The disk 13 is also shown in a second deflected position 53. The angled plates 15, 17 are not shown in FIG. 7. The arrows shown at the inner peripheral edge 25 of the disk 13 in the first position 51 represent the load applied to the disk 13 by the first angled plate 15. The triangular shapes shown at the outer peripheral edge 27 of the disk 13 represent the reaction load applied by the second angled plate 17 when load is applied to the disk 13 by the first angled plate 15.

The invention contemplates a disk spring assembly design in which load may be applied by the second angled plate 17 at the outer peripheral edge 27 of the disk 13 and an equal reaction load would be applied at the inner peripheral edge by the 25 of the disk 13 by the first angled plate 15 as the deflection of the disk 13 would be the same.

"Angled plates," as used herein, means any pair of plates having initial contact points (i.e., the points where the plates first contact the disk) that are axially displaced relative to one another such that the initial contact point of one of the plates is at the inner peripheral edge of the disk and the initial contact point of the other plate is at the outer peripheral edge of the disk. Any such pair of plates may be considered a first angled plate and a second angled plate within the scope of this invention. For instance, in the spring assembly shown in FIGS. 5–6b, the first angled plate 15 has an initial contact point at which it first contacts and applies force to the disk 13 at the inner peripheral edge 25 of the disk 13. The second angled plate 17 has an initial contact point at which it first contacts and applies force to the disk 13 at the outer peripheral edge 27 of the disk 13.

Figure 8A:
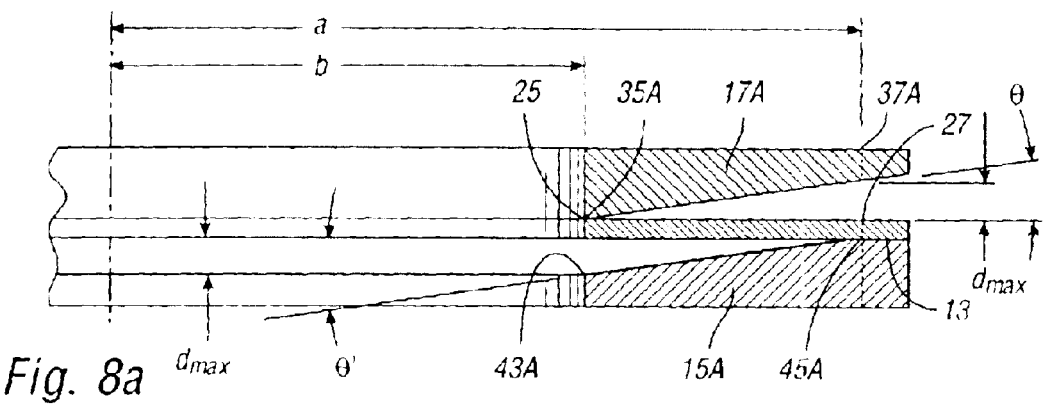
FIG. 8a is a schematic illustration in partial vertical cross-sectional view of a first alternative embodiment of a disk spring assembly.

In FIGS. 8a–8d, wherein like reference numbers refer to like components in FIGS. 1–7, some alternative designs for angled plates within the scope of the invention are depicted. Referring to FIG. 8a, a first angled plate 15A is tapered such that its outer peripheral edge 45A is thicker than its inner peripheral edge 43A and the initial contact point at which it first contacts and applies force to the disk 13 is the outer peripheral edge 27 of the disk 13. A second angled plate 17A is tapered such that its inner peripheral edge 35A is thicker than its outer peripheral edge 37A and the initial contact point at which it first contacts and applies force to the disk 13 is the inner peripheral edge 25 of the disk 13. The plates 15A, 17A would cause the same maximum deflection $d_{max}$ and would define the same angles θ, θ' as the plates 15, 17 in FIG. 1 and FIGS. 3a–6b.

Figure 8B:
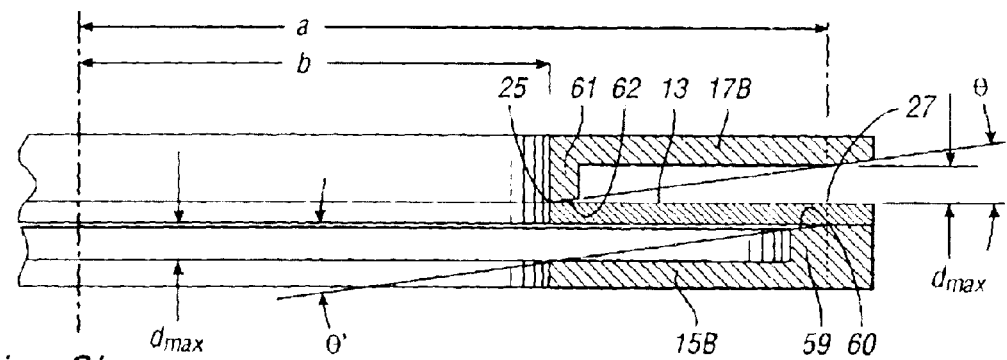
FIG. 8b is a schematic illustration in partial vertical cross-sectional view of a second alternative embodiment of a disk spring assembly.

Referring to FIG. 8b, a first angled plate 15B is shown that has an angled arm 59 with an angled edge 60 that initially contacts the disk 13 at the outer peripheral edge 27 of the disk 13. A second angled plate 17B is shown that has an angled arm 61 with an angled edge 62 that initially contacts the disk 13 at the inner peripheral edge 25 of the disk 13. Equivalent angles θ, θ' that are substantially the same as those defined by the plates 15, 17 are formed between the disk 13 and lines shown extending from the angled edges 60, 62 of the angled arms 59, 61 on the respective plates 15B, 17B. The plates 15B, 17B would cause the same maximum deflection $d_{max}$ as the plates 15, 17 in FIG. 1 and FIGS. 3a–6b.

Figure 8C:
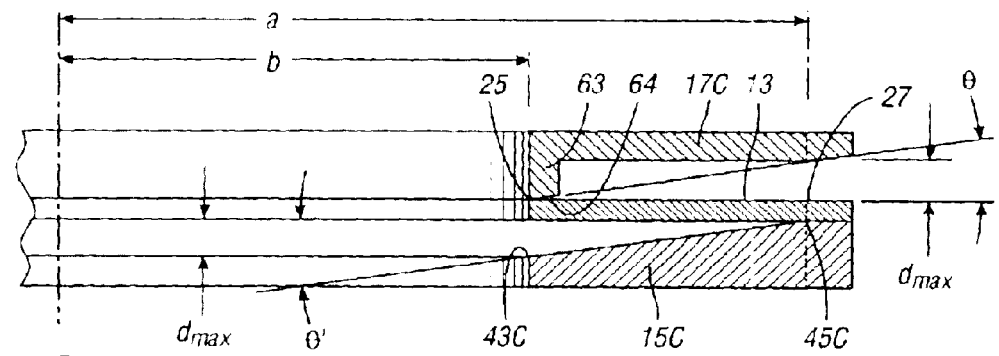
FIG. 8c is a schematic illustration in partial vertical cross-sectional view of a third alternative embodiment of a disk spring assembly.

Referring to FIG. 8c, a first angled plate 15C is tapered such that the outer peripheral edge 45C is thicker than the inner peripheral edge 43C. The first angled plate 15C initially contacts the disk 13 at the outer peripheral edge 27 of the disk 13. A second angled plate 17C is shown that has an angled arm 63 with an angled edge 64 that initially contacts the disk 13 at the inner peripheral edge 25 of the disk 13. Equivalent angles θ, θ' that are substantially the same as those defined by the plates 15, 17 are formed between the disk 13 and a line shown extending from the angled edge 64 of the angled arm 63 on the plate 17C and between the disk 13 and the first angled plate 15C, respectively. The plates 15C, 17C would cause the same maximum deflection $d_{max}$ as the plates 15, 17 in FIGS. 1, 3a–6b.

Figure 8D:
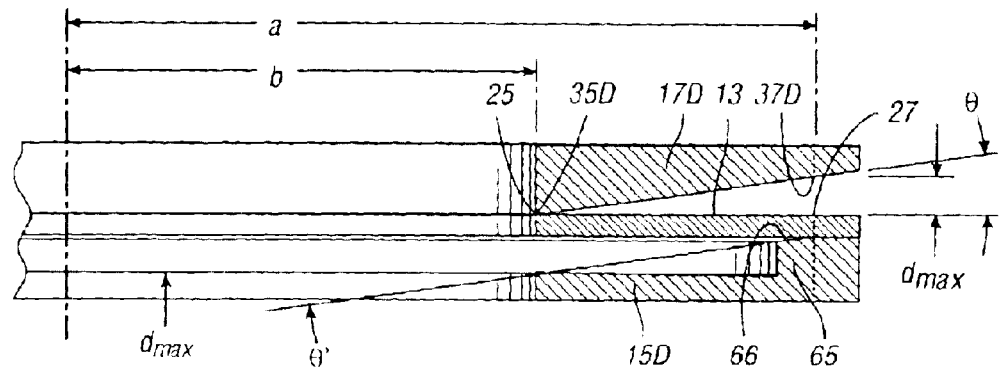
FIG. 8d is a schematic illustration in partial vertical cross-sectional view of a fourth alternative embodiment of a disk spring assembly.

Referring to FIG. 8d, a first angled plate 15D is shown that has an angled arm 65 with an angled edge 66 that initially contacts the disk 13 at the outer peripheral edge 27 of the disk 13. A second angled plate 17D is tapered such that its inner peripheral edge 35D is thicker than its outer peripheral edge 37D. The plate 17D initially contacts the disk 13 at the inner peripheral edge 25 of the disk 13. Equivalent angles θ, θ' that are substantially the same as those defined by the plates 15, 17 are formed between the disk 13 and the second angled plate 17D and between the disk 13 and a line shown extending from the angled edge 66 of the angled arm 65 of the first angled plate 15D, respectively. The plates 15D, 17D would cause the same maximum deflection $d_{max}$ as the plates 15, 17 in FIGS. 1, 3a–6b.

The invention contemplates that, in each of FIGS. 5–6b and 8a–8d, the first angled plate may be a piston that moves toward the disk 13 by an hydraulic force and applies a force to the disk 13 at either the inner peripheral edge 25 of the disk 13 or the outer peripheral edge 27 of the disk 13, depending upon which edge the first angled plate first contacts, as depicted in the above referenced Figures. In FIG. 1, the invention contemplates that the piston 19 and the first angled plate 15 may be integral.

Figure 9:
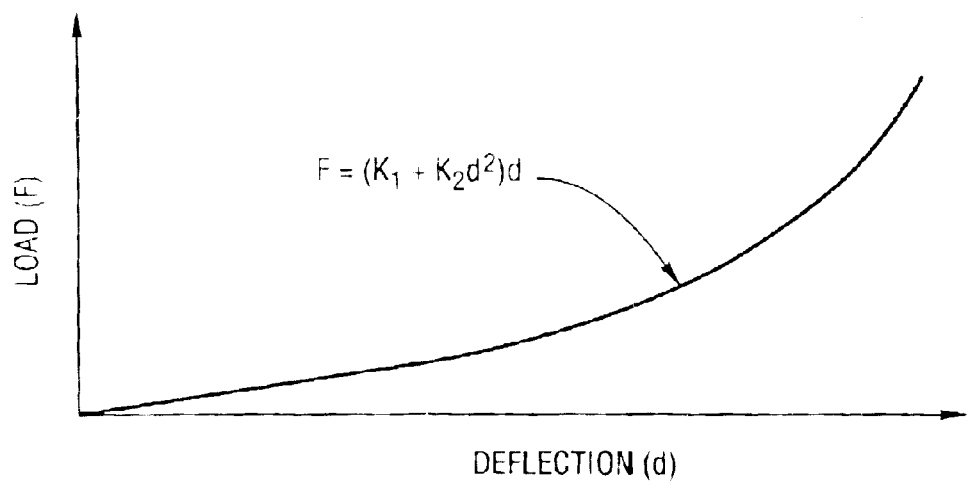
FIG. 9 is a graph of the theoretical relationship between load F and deflection d of a disk in the disk spring assembly of FIG. 1.

FIG. 9 is a graph representing the theoretical relationship between load F applied to the disk 13 and deflection d of the disk. The theoretical relationship is:

$$F = K_1 d + K_2 d^3 \text{ wherein } K_1 = Nt^3, K_2 = N\frac{t}{2},$$

$$N = \frac{E}{(1-v^2)Ma^2}, \frac{1}{M} = \left(\frac{\alpha+1}{\alpha-1} - \frac{2}{\ln\alpha}\right)\pi\left(\frac{\alpha}{\alpha-1}\right)^2, \text{ and } \alpha = \frac{a}{b}.$$

In the above equations, the outer radius of the disk 13 is a, the inner radius of the disk 13 is b and the thickness of the disk is t. E is the modulus of elasticity, known as Young's Modulus, which is 206,900 N/mm$^2$ for steel. E is the ratio between stress and strain in a metal during elastic deformation. Poisson's ratio, or $v$, is the negative ratio between lateral strain and direct tensile strain when load is applied to a metal. For steel, $v$=0.3.

The stiffness of a flat washer like the disk 13 is the ratio of the change in force, F, applied to the disk to the change in deflection, d, of the disk in the direction of application of the force, F. The stiffness, S, can be derived from the above equation relating load, F, to deflection, d, as:

$$S = \frac{\delta F}{\delta d} = K_1 + 3K_2 d^2$$

wherein $K_1$ and $K_2$ are as described above. Thus, the stiffness of the washer 13 increases in proportion to the square of the deflection d. This monotonically increasing stiffness with deflection is ideal for automotive clutch applications as the clutch will be engaged smoothly, rather than abruptly, as force applied to the disk is met with increasing resistance (stiffness) during deflection of the spring.

Figure 10:
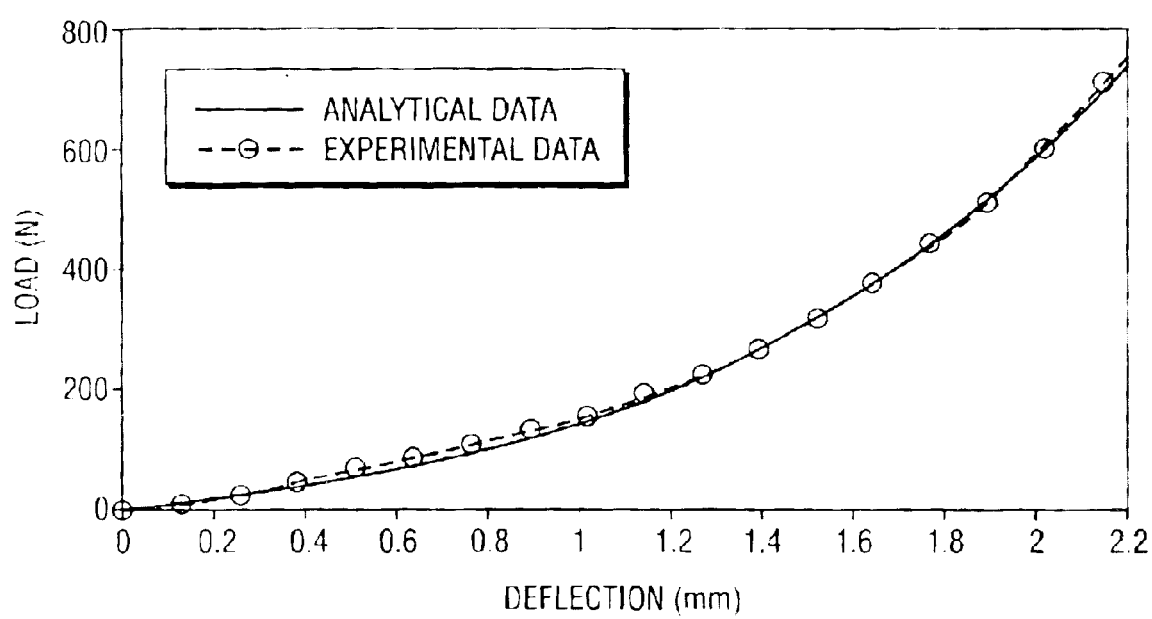
FIG. 10 is a graph of analytical and experimental data related to load in Newtons (N) applied to the disk in the disk spring assembly of FIG. 1 versus the deflection of the disk in millimeters (mm).

Referring to FIG. 10, wherein like reference numbers refer to like components in FIGS. 1–9, a plot of analytical data (represented by a solid line) and experimental data (represented by a dashed line with data points) showing the relationship between the load F applied to the disk and the deflection d of the disk. The load F is measured in Newtons (N) and the deflection d is measured in millimeters (mm). As shown in FIG. 10, a good correlation is achieved between the experimental data and the theoretical relationship between load F and deflection d over the deflection range 0–2.2 mm. The experimental data was achieved using a steel disk having an outer radius a of 65.5 mm, an inner radius b of 42.5 mm and a thickness t of 1 mm. In a preferred embodiment, the maximum deflection $d_{max}$ of the disk 13 would be about 2.2 mm.

As set forth in the claims, various features shown and described in accordance with the different embodiments of the invention illustrated may be combined.

While the best modes for carrying out the invention have been described in detail, those familiar with the art to which this invention relates will recognize various alternatives designs and embodiments for practicing the invention within the scope of the appended claims.

What is claimed is:

1. A disk spring assembly for smooth clutch application, comprising:
   a substantially flat ring-shaped disk having opposed faces and a hole formed in the center of the disk such that the disk has an inner peripheral edge and an outer peripheral edge;
   a movable first angled plate located adjacent to one opposed face; and
   a second angled plate located adjacent to the other opposed face such that the inner and outer peripheral edges of the disk are deflected in opposite directions relative to each other when the disk moves toward the second plate during engagement of the clutch.

2. The disk spring assembly of claim 1, wherein the plates each have an angled face, the angled face of the first plate is located adjacent to a face of the disk such that an angle is formed by the first plate and the disk at the inner peripheral edge, and the angled face of the second plate is located adjacent to the opposed face of the disk such that a substantially equivalent angle is formed by the second plate and the disk at the outer peripheral edge.

3. The disk spring assembly of claim 1, wherein the first plate is configured such that it first contacts and applies load at the inner peripheral edge of the disk when it moves toward the disk.

4. The disk spring assembly of claim 1, wherein the second plate is configured such that it first contacts and applies a reaction load at the outer peripheral edge of the disk when the disk is moved toward the second plate by the first plate.

5. The disk spring assembly of claim 2, wherein the opposed faces of the disk are in substantially complete contact with the respective angled faces of the plates when the clutch is engaged.

6. The disk spring assembly of claim 1, wherein the maximum deflection of the disk is defined by the angled plates.

7. The disk spring assembly of claim 5, wherein the maximum deflection of the disk occurs when the opposed faces of the disk are in substantially complete contact with the respective angled faces of the plates.

8. The disk spring assembly of claim 5, wherein load applied by the first plate is uniformly distributed across the substantially completely contacted faces of the disk and the plates.

9. The disk spring assembly of claim 5, wherein the disk has an inner radius at its inner peripheral edge and an outer radius at its outer peripheral edge; and
   wherein the angled face of each plate has a substantially equivalent inner and outer radius.

10. The disk spring assembly of claim 1, wherein the stiffness of the disk increases in proportion to the square of the deflection of the disk.

11. The disk spring assembly of claim 1, wherein the disk has an inner radius at the inner peripheral edge, an outer radius at the outer peripheral edge, and a substantially uniform thickness between the opposed faces; and
   wherein the stiffness of the disk is the ratio of the change in force applied to the disk to the change in deflection of the disk;
   wherein the stiffness of the disk is represented by S and is determined in accordance with the following formula:

$$S = K_1 + 3K_2 d^2 \text{ wherein } K_1 = Nt^3, K_2 = N\frac{t}{2}, N = \frac{E}{(1-v^2)Ma^2},$$

$$\frac{1}{M} = \left(\frac{\alpha+1}{\alpha-1} - \frac{2}{\ln\alpha}\right)\pi\left(\frac{\alpha}{\alpha-1}\right)^2, \text{ and } \alpha = \frac{a}{b},$$

wherein a represents the outer radius of the disk, b represents the inner radius of the disk, E is Young's modulus, t represents the thickness of the disk, and $v$ is Poisson's ratio.

12. The disk spring of claim 1, wherein the disk is steel.

13. A spring assembly for enhancing clutch smoothness, comprising:
   a substantially flat washer having opposing faces;
   a first ring-shaped plate with an angled face forming an outwardly conical shape located adjacent to one washer face; and
   a second ring-shaped plate with an angled face forming an inwardly conical shape located adjacent to the opposed washer face, wherein the angled faces are cooperatively configured to contact the respective adjacent faces of the washer when the first plate moves axially relative to the second ring shaped plate in the direction of the washer during engagement of the clutch.

14. The spring assembly of claim 13, wherein the first plate is located such that it initially contacts and applies load to the washer at an inner peripheral edge of the washer when the first plate moves in the direction of the washer along an axis substantially through the center of the washer.

15. The spring assembly of claim 14, wherein the second plate is located such that it initially contacts and applies a reaction load to the washer at an outer peripheral edge of the washer when the washer is moved toward the second plate by the first plate.

16. The spring assembly of claim 13 wherein the opposed faces of the washer are in substantially complete contact with the respective angled faces of the plates when the clutch is engaged.

17. The spring assembly of claim 13, wherein the maximum deflection of the washer is defined by the angled faces of the plates.

18. The spring assembly of claim 13, wherein the maximum deflection of the washer occurs when the opposed faces of the washer are in substantially complete contact with the respective angled faces of the plates.

19. The spring assembly of claim 16, wherein load applied by the first plate is uniformly distributed across the substantially completely contacted faces of the washer and the plates.

20. The spring assembly of claim 13, wherein the washer has an inner radius at its inner peripheral edge, an outer radius at its outer peripheral edge, and the angled face of each plate has a substantially equivalent inner and outer radius.

21. The spring assembly of claim 13, wherein the stiffness of the washer increases in proportion to the square of the deflection of the washer.

22. The spring assembly of claim 13, wherein the washer has an inner radius at its inner peripheral edge, an outer radius at its outer peripheral edge, and a substantially uniform thickness between the opposed faces; and
   wherein the stiffness of the washer is the ratio of the change in force applied to the washer to the change in deflection of the washer;
   wherein S represents the stiffness of the washer and is determined in accordance with the following formula:

$$S = K_1 + 3K_2 d^2 \text{ wherein } K_1 = Nt^3, K_2 = N\frac{t}{2}, N = \frac{E}{(1-v^2)Ma^2},$$

$$\frac{1}{M} = \left(\frac{\alpha+1}{\alpha-1} - \frac{2}{\ln\alpha}\right)\pi\left(\frac{\alpha}{\alpha-1}\right)^2, \text{ and } \alpha = \frac{a}{b},$$

wherein a represents the outer radius of the washer, b represents the inner radius of the washer, E is Young's modulus, t represents the thickness of the washer, and v is Poisson's ratio.

23. The spring assembly of claim 22, wherein the washer is steel.

24. A disk spring assembly for enhancing clutch smoothness, comprising:
   a ring-shaped disk having opposing faces;
   first and second ring-shaped plates positioned at opposing sides of the disk, one of said plates being tapered such that its inner peripheral edge is thicker than its outer peripheral edge, the other of said plates being tapered such that its outer peripheral edge is thicker than its inner peripheral edge, defining an angled face of each plate;
   wherein the first plate is located such that it initially contacts and applies load to the disk at an inner peripheral edge of the disk when the first plate moves in the direction of the disk;
   wherein the second plate is located such that it initially contacts and applies a reaction load to the disk at an outer peripheral edge of the disk when the disk is moved toward the second plate by the first plate;
   wherein the disk is deflected by the load applied by the first plate;
   wherein the faces of the deflected disk are in substantially complete contact with respective angled faces of the plates when the disk is deflected; and
   wherein the load applied by the first plate is uniformly distributed over the substantially completely contacted faces of the disk and the plates.

* * * * *